J. H. GILLILAND.
SPRING AXLE.
APPLICATION FILED APR. 24, 1914.
1,128,770.
Patented Feb. 16, 1915.
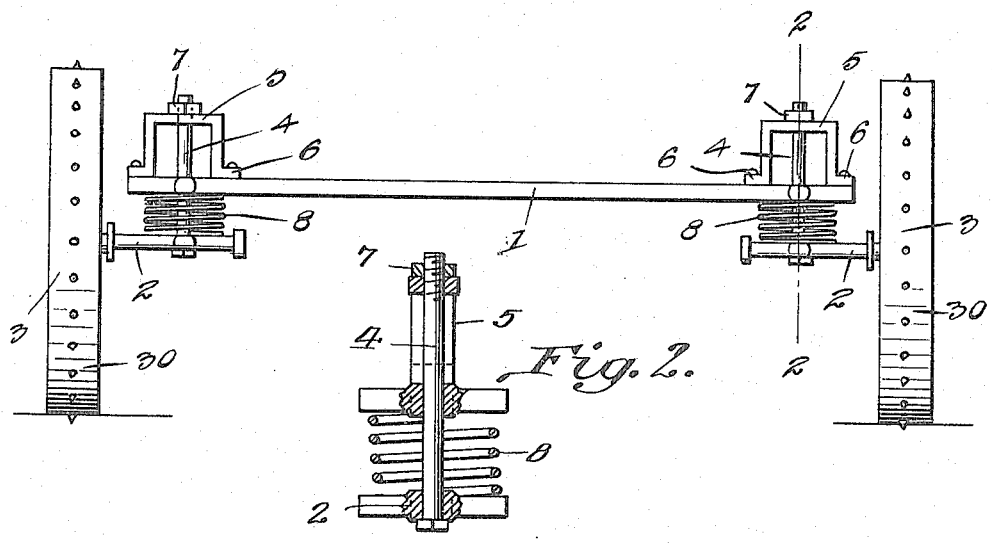
Inventor
J. H. Gilliland.

UNITED STATES PATENT OFFICE.

JAMES H. GILLILAND, OF GREENSBORO, NORTH CAROLINA.

SPRING-AXLE.

1,128,770.　　　　　Specification of Letters Patent.　　Patented Feb. 16, 1915.

Application filed April 24, 1914. Serial No. 834,272.

*To all whom it may concern:*

Be it known that I, JAMES H. GILLILAND, a citizen of the United States, residing at Greensboro, in the county of Guilford and State of North Carolina, have invented certain new and useful Improvements in Spring-Axles; and I do hereby declare the following to be a full, clear, and exact description of the invention, such as will enable others skilled in the art to which it appertains to make and use the same.

This invention comprehends certain new and useful improvements in spring axles, and has for its primary object to provide a device of this character which will be especially adapted for automobiles and the like and effectively serve to relieve the body of the vehicle of shocks incident to the engagement of the wheels with stones or other obstructions in the path of the vehicle.

This invention has for a further object to generally improve and simplify devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is an elevational view of the front axle of an automobile constructed in accordance with my invention, and Fig. 2 is a detail sectional view taken on the plane of line 2—2 of Fig. 1.

Referring in detail to the drawings by numerals, 1 designates the front axle, beneath the opposite ends of which are positioned the stub axles 2, having the wheels 3 mounted thereon. The stub axles 2 are pivotally connected with the main front axle 1 by means of the vertical pivot pins 4 passed therethrough and through the main front axle 1 the upper extremities of said pivot pins being also passed through the main or central portions of the U-shaped guide members 5 which have the free lower ends of their legs turned outwardly, as shown at 6, and secured to the upper face of the axle 1. To prevent withdrawal of the pivot pins 4, I have secured nuts 7 upon their upper extremities which bear against the upper faces of the main portions of the guide members 5, as clearly shown in Fig. 1.

It will be understood that the body of the vehicle (not shown), is supported upon the main front axle 1, in any suitable manner, and said main front axle 1 is resiliently retained in spaced position above the stub axles 2 by means of the helical springs 8 and engaged around the pivot pins 4 and having one end bearing against the under face of the main axle 1, while the opposite end bears against the upper face of the stub shafts 2. It will be understood, however, that the springs 8 will not interfere with the proper turning of the stub shafts 2 and wheels 3 with respect to the main front axle 1.

From the foregoing it will be clearly apparent that I have provided a new and improved front spring axle for resiliently supporting the bodies of automobiles and other vehicles, and it will be evident that when the axles are constructed and supported in accordance with my invention, metallic rims 30 may be mounted upon the front wheels 3, in place of pneumatic tires, now in general use, thereby greatly reducing the cost and upkeep of automobiles and the like.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

A device of the class described comprising an axle, an inverted U-shaped guide secured upon one end of the axle, a stub axle beneath the first mentioned axle and parallel therewith, a vertical pivot pin secured through said stub axle and rotatably mounted through the first mentioned axle, the upper end of said vertical pivot pin being secured through the horizontal central portion of the inverted U-shaped guide member, said stub axle being adapted to move vertically upon said vertical pivot pin, a head formed on the lower end of said vertical pin to limit downward movement of said stub axle upon said pivot pin, a wheel mounted upon said stub axle, and a helical spring positioned around said vertical pivot pin below the first mentioned axle and having one end bearing against the same, while the opposite end of said spring bears upon the upper face of the stub axle to resiliently retain the latter in its lowermost position.

In witness whereof I affix my signature in presence of two witnesses.

JAMES H. GILLILAND.

Witnesses:
A. W. VICKORY,
W. M. MONTGOMERY.

Copies of this patent may be obtained for five cents each, by addressing the "Commissioner of Patents, Washington, D. C."